(12) United States Patent
Allsworth

(10) Patent No.: US 12,196,708 B2
(45) Date of Patent: Jan. 14, 2025

(54) SENSOR SYSTEM

(71) Applicants: Owlstone Medical Limited, Cambridge (GB); Owlstone Inc., Westport, CT (US)

(72) Inventor: Max Allsworth, Essex (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 213 days.

(21) Appl. No.: 17/614,700

(22) PCT Filed: May 29, 2020

(86) PCT No.: PCT/GB2020/051308
§ 371 (c)(1),
(2) Date: Nov. 29, 2021

(87) PCT Pub. No.: WO2020/240201
PCT Pub. Date: Dec. 3, 2020

(65) Prior Publication Data
US 2022/0221425 A1 Jul. 14, 2022

(30) Foreign Application Priority Data
May 31, 2019 (GB) ..................................... 1907756

(51) Int. Cl.
*G01N 27/624* (2021.01)
(52) U.S. Cl.
CPC .................. *G01N 27/624* (2013.01)
(58) Field of Classification Search
CPC .... G01N 27/624; G01N 27/622; G01N 27/64; H01J 49/06
See application file for complete search history.

(56) References Cited

U.S. PATENT DOCUMENTS 5,347,125 A 9/1994 Holmes et al.
5,504,328 A 4/1996 Bonser
(Continued)

FOREIGN PATENT DOCUMENTS

EP 2126960 A2 12/2009
WO 2019/048886 A1 3/2019
(Continued)

OTHER PUBLICATIONS

European Patent Office, PCT International Search Report and Written Opinion, PCT/GB2020/051308, Aug. 21, 2020.
(Continued)

*Primary Examiner* — Dominic E Hawkins
(74) *Attorney, Agent, or Firm* — Leveque Intellectual Property Law, P.C.

(57) ABSTRACT

The present disclosure relates to sensor systems and methods for analysing fluid samples. The sensor system comprises a housing (220) having an inlet for a fluid sample to enter the housing, an outlet for the fluid sample to exit the housing, and a fluid sample path within the housing for the fluid sample to flow between the inlet and the outlet. The sensor system also comprises an ionizer (210) which is external to the housing and which is for ionizing the fluid sample at a first location on the fluid sample path to generate sample ions, an ion mobility filter (212) which is at least partially located within the housing and which is for filtering the generated sample ions at a second location on the fluid sample path, and a detector (214) which is external to the housing and which is for detecting the sample ions which pass through the ion mobility filter at a third location on the fluid sample path.

13 Claims, 8 Drawing Sheets

(56) References Cited

U.S. PATENT DOCUMENTS

| | | | |
|---|---|---|---|
| 6,512,224 B1 | 1/2003 | Miller et al. | |
| 8,217,344 B2* | 7/2012 | Miller | G01N 27/624 |
| | | | 250/281 |
| 2002/0190205 A1* | 12/2002 | Park | H01J 49/4225 |
| | | | 250/282 |
| 2003/0070913 A1 | 4/2003 | Miller et al. | |
| 2005/0023457 A1* | 2/2005 | Miller | G01N 27/624 |
| | | | 250/288 |
| 2007/0272852 A1* | 11/2007 | Miller | H01J 49/164 |
| | | | 250/281 |
| 2009/0045331 A1* | 2/2009 | Miller | F03H 1/00 |
| | | | 250/282 |
| 2010/0282961 A1 | 11/2010 | Miller et al. | |
| 2012/0160997 A1* | 6/2012 | Fink | H01J 49/10 |
| | | | 250/288 |
| 2014/0291506 A1* | 10/2014 | Tikhonski | H01J 49/022 |
| | | | 250/288 |
| 2015/0300927 A1* | 10/2015 | Easton | G01N 27/622 |
| | | | 73/863.52 |
| 2015/0377844 A1* | 12/2015 | Horiike | G01N 27/70 |
| | | | 73/23.4 |
| 2016/0336159 A1 | 11/2016 | Toutoungi et al. | |
| 2018/0067082 A1* | 3/2018 | Shinada | G01N 30/64 |

FOREIGN PATENT DOCUMENTS

| | | |
|---|---|---|
| WO | 2019/058115 A1 | 3/2019 |
| WO | 2019/097234 A1 | 5/2019 |
| WO | 2019/069089 A1 | 11/2019 |

OTHER PUBLICATIONS

Krylov et al., "Temperature effects in differential mobility spectrometry," International Journal of Mass Spectrometry 279 (Nov. 12, 2008) 119-125.

Wilks et al., "Characterisation of a miniature, ultra-high field, ion mobility spectrometer," Int. J. Ion Mobil Spec. (Aug. 30, 2012) 15:199-222.

* cited by examiner

SENSOR SYSTEM

TECHNICAL FIELD

The present disclosure relates to sensor systems and methods for analysing fluid samples.

BACKGROUND

The ability to ionize gases using ion mobility systems is useful for a wide range of applications including many chemical detection applications. Ionization techniques, in which a gas sample is ionized and then separated into constituent parts that can be detected individually, are widely used for gas composition sensing. Two well-known examples are Ion Mobility Spectrometry (IMS) and Field Asymmetric Ion Mobility Spectrometry (FAIMS), also known as Differential Mobility Spectrometry (DMS). Ion mobility detection techniques tend to be very well suited to measuring trace constituents of gas mixtures that often consist of a carrier gas with additional gases mixed in at low concentrations (for example part-per-million or part-per-billion levels).

Ion mobility techniques can also be used effectively over a range of gas pressures, including pressures close to one atmosphere. This makes them useful for, amongst other things, measuring low-level impurities in air. The sample gas is passed through an ionizer to produce a population of ionized molecules that are then manipulated in some way involving separation or selection of ionized molecules according to their behaviour in an electric field, before being detected. Ionizers commonly in use include radioactive sources, light-based devices such as ultra-violet lamps, and electrostatic devices such as corona discharge ionizers.

Stability and repeatability of DMS spectra are important issues in the use of DMS in analytical applications, as explained for example in "Temperature effects in differential mobility spectrometry" by Krylov et al in International Journal of Mass Spectrometry 279 (2009) 119-125. Various factors, including humidity, are known to influence the field dependence of ion mobility, changing peak positions in the DMS spectra.

The present applicant has recognised the need to address humidity issues with ion mobility systems.

SUMMARY

According to the present invention there is provided a system and method as set forth in the appended claims. Other features of the invention will be apparent from the dependent claims, and the description which follows.

We describe a sensor system comprising a housing having an inlet for a fluid sample to enter the housing, an outlet for the fluid sample to exit the housing, and a fluid sample path within the housing for the fluid sample to flow between the inlet and the outlet, an ionizer which is external to the housing and which is for ionizing the fluid sample at a first location on the fluid sample path to generate sample ions, an ion mobility filter which is at least partially located within the housing and which is for filtering the generated sample ions at a second location on the fluid sample path, and a detector which is external to the housing and which is for detecting the sample ions which pass through the ion mobility filter at a third location on the fluid sample path.

The ionizer and the detector are both external, i.e. no components are located within the housing and thus no components are within the fluid sample path. In other words, the ionizer and the detector do not contact the fluid sample as it passes through the system. Thus, the ionizer and the detector need not be coated or formed from materials which avoid contamination and may be cheaper to manufacture.

The housing may be at least partially formed from a dielectric material and may be completely formed from a dielectric material. The housing may be at least partially formed from a transparent material and may be completely transparent. The housing may comprise glass and may be completely formed from glass. Glass is a relatively cheap and commonplace transparent dielectric material.

The housing may comprise a first layer and a second layer separated by at least one spacer. The fluid sample path may be between the first and second layers. The first and second layers may be generally plate-like. The first and second layers may be integrally formed with the spacer(s) or may be formed separately and bonded together using suitable techniques.

The ionizer may be a dielectric barrier ionizer. The ionizer may comprise first and second electrodes. The housing may comprise a dielectric material adjacent at least one of (or both of) the first and second electrodes. In other words, the housing forms the dielectric barrier needed to create the ion discharge between the electrodes. The first and second electrodes may be mounted to opposed outer surfaces of the housing. For example, the first electrode may be mounted to an outer surface of the first layer of the housing and the second electrode may be mounted to an outer surface of the second layer of the housing. At least one of the first and second electrodes may be partially embedded within the housing and may be separated from the fluid sample path by the housing.

The ion filter may comprise an electrode layer which is positioned in the fluid sample path within the housing. The electrode layer may be a single layer, e.g. monolithic or there may be a plurality of layers. The electrode layer(s) may comprise a plurality of mechanically separated electrodes. Alternatively, the electrode layer(s) may comprise a plurality of interdigitated electrodes. Ion channels are defined between electrodes of opposed polarity. A via may be formed through the housing to connect to the electrode layer within the housing. The via may be sealed to prevent contact between the fluid sample and other components of the ion filter, e.g. the drive system, which are external to the housing.

A compensation field and a dispersion field may be applied to the ion filter to filter the generated ions. The system may further comprise a drive signal system which applies the compensation field and the dispersion field to the ion filter. The compensation field and the dispersion field may be considered to separate (i.e. filer) ions within the ion filter.

The system may further comprise a radiation source which is located outside the fluid sample path and which is for radiating ions in the vicinity of the ion filter. A portion of the housing between the radiation source and the fluid sample path may be made of a transparent material, i.e. a material which is transparent to the radiation being transmitted through the housing to the fluid sample path.

The detector may be a fly-through inductive charge counter. The detector may measure an output ion current.

The sensor system may be a spectrometry system, more specifically a field asymmetric ion mobility system. The system may extract a spectrum of peak intensity of the measured output as a function of the compensation field and the dispersion field.

We also describe a method of analysing a fluid sample, the method comprising: passing the fluid sample along a fluid sample path within a housing, ionizing, using an ionizer, the fluid sample at a first location on the fluid sample path to generate sample ions, filtering, using an ion mobility filter, the generated sample ions at a second location on the fluid sample path, and detecting, using a detector, the ions passing through the ion mobility filter at a third location on the fluid sample path, wherein the ionizer and the detector are external to the housing and are outside the fluid sample path.

There may be a pump to pass the fluid sample along the fluid sample path. The method may further comprise transmitting radiation through a transparent portion of the housing to excite target ions from the generated sample ions.

It will be appreciated that the features above described in relation to the method also apply to the system.

BRIEF DESCRIPTION OF DRAWINGS

For a better understanding, and to show how embodiments may be carried into effect, reference will now be made, by way of example only, to the accompanying diagrammatic drawings in which:

FIG. 1b is a schematic illustration of a channel within an ion filter in the system of FIG. 1a;

FIG. 1c is an alternative schematic illustration of the spectrometry system of FIG. 1a;

DETAILED DESCRIPTION OF DRAWINGS

Figure 1A:
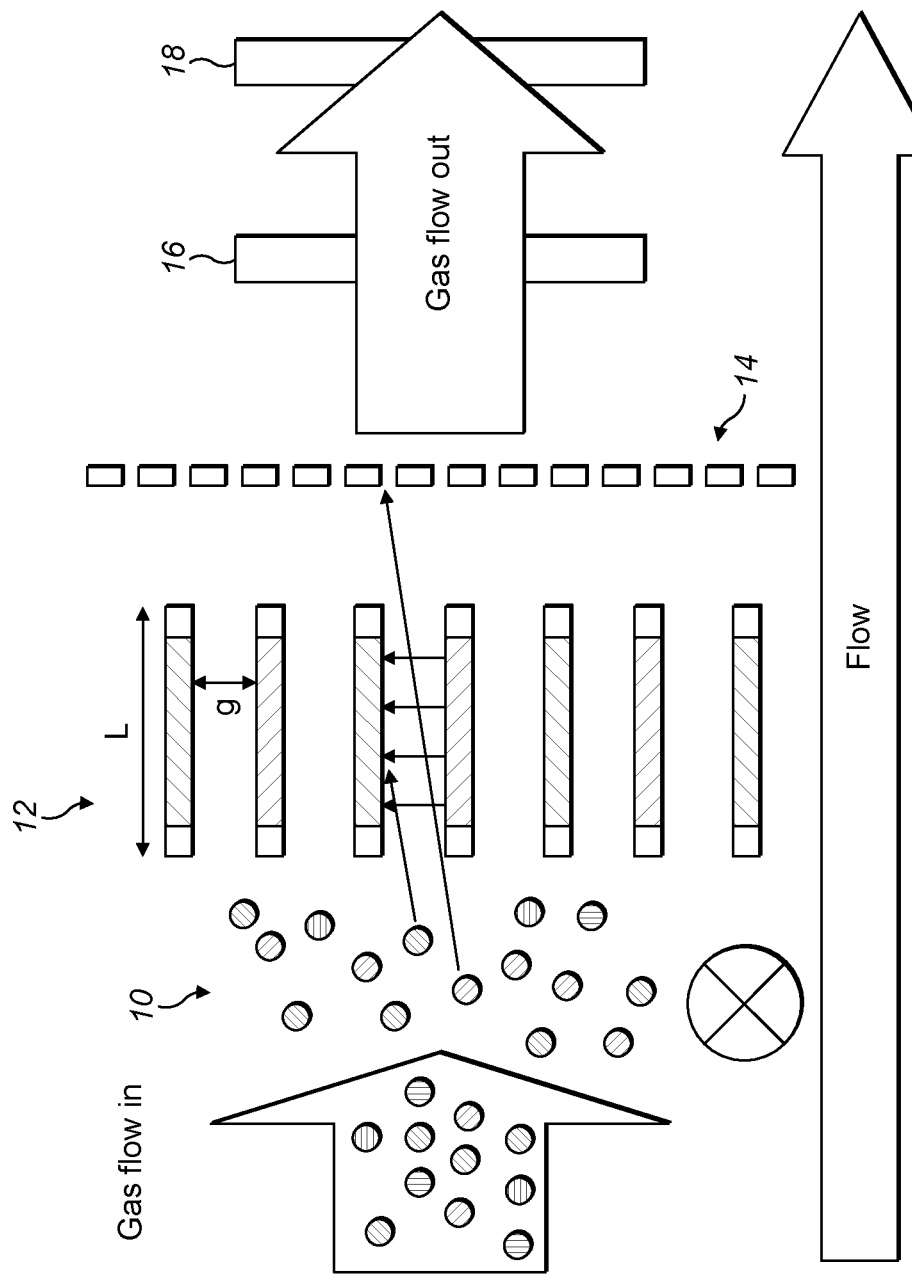
FIG. 1a is a schematic illustration of a spectrometry system.
Figure 1B:
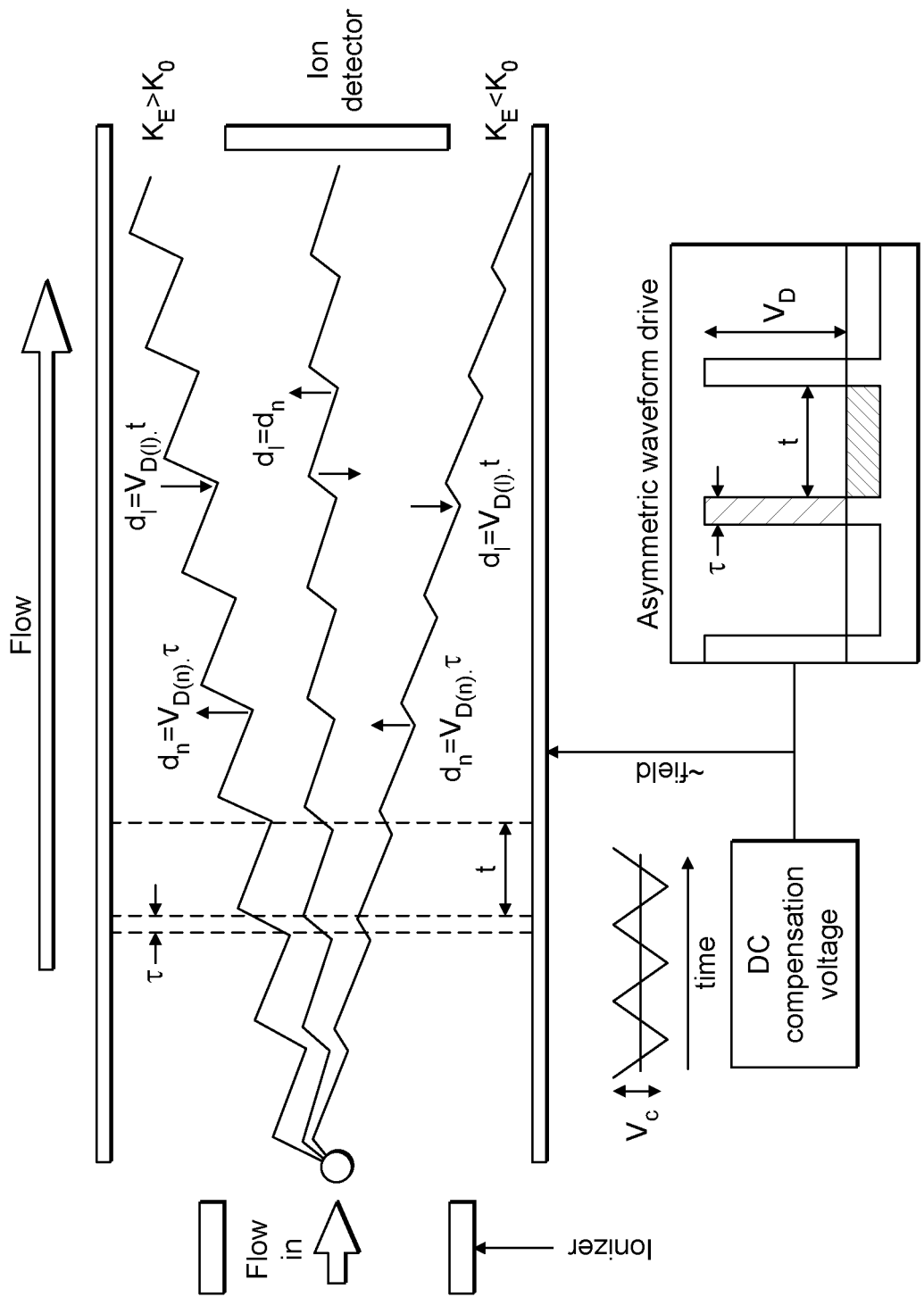
Figure 1C:
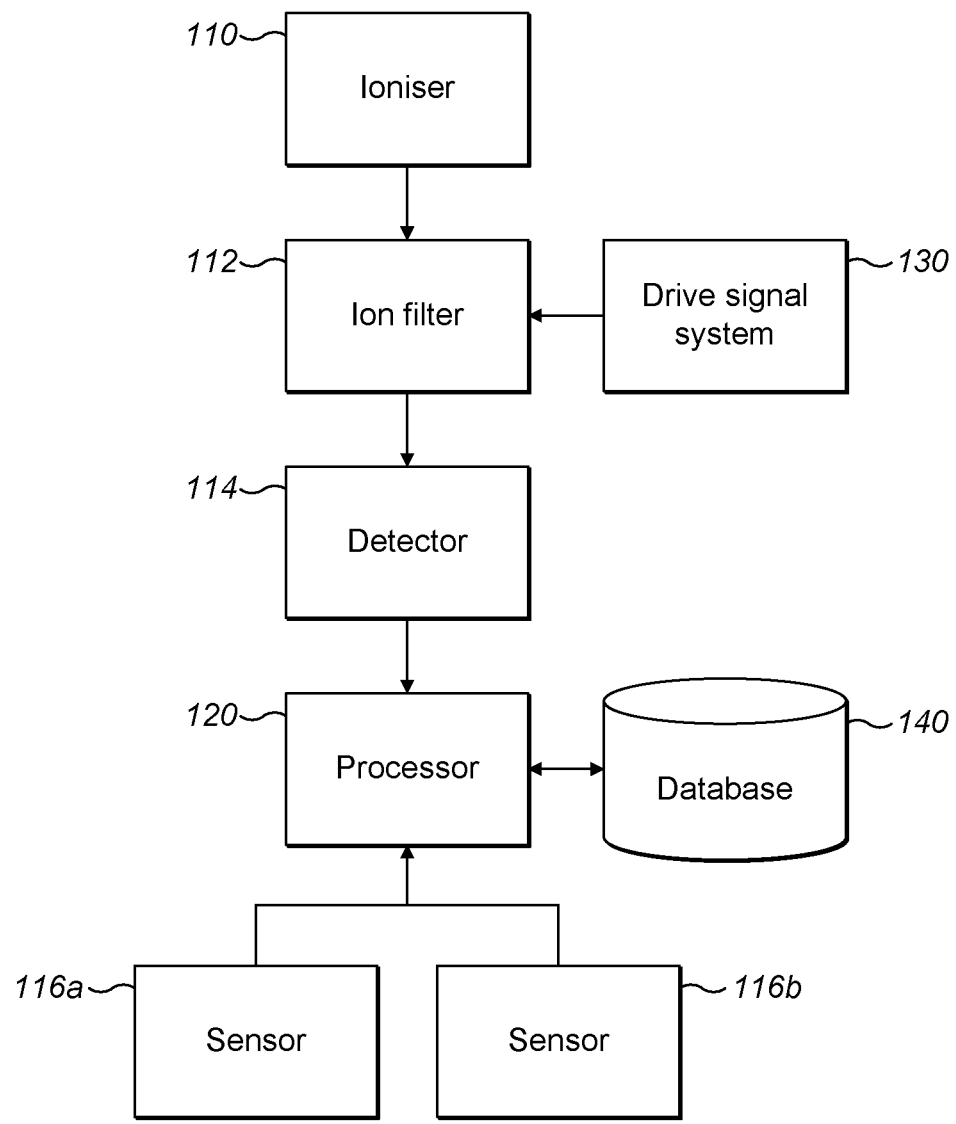

FIGS. 1a to 1c shows a schematic illustration of a spectrometry system which may be a miniature device as described in "Characterisation of a miniature, ultra-high field, ion mobility spectrometer" by Wilks et al published in Int. J. Ion Mobil Spec. (2012) 15:199-222. As shown in FIG. 1a, gas flows into an ionizer 10 and the generated ions then pass through an ion filter 12. The ion filter separates the ions and may thus be termed an ion separator. In the illustrated example, the ion filter has a plurality of ion channels each having a small gap width (g of around 30 to 50 μm) and relatively short length (e.g. L around 300 μm). The gap surfaces are made of high-conductivity silicon (or similar material) and are electrically connected via wire bonding to metal pads on the face of the silicon. Ions exiting from the ion separator are detected by an ion detector 14. It is known that temperature and pressure can affect the results and thus a temperature sensor 16 and/or a pressure sensor 18 may also be included in the system. These are shown schematically on the output gas flow but could be incorporated into another appropriate location within the device.

As shown in FIG. 1b, an oscillating electric field is applied to the ion separator. A variable high-voltage asymmetric waveform of low voltage pulse duration t(s) and high voltage pulse duration τ(s) and peak voltage $V_D$ is applied to create the variable field of $V_D/g$ (kVcm$^{-1}$). The mobility of each ion within the ion separator oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length ($d_h$–$d_t$) through the ion filter which is determined by their high and low field drift velocity ($v_{D(h)}$ and $v_{D(l)}$ and the high field and low field pulse durations. Only ions in a "balanced" condition such as the middle ion in FIG. 1b will exit from the ion separator and be detected by the ion detector. Ions which contact either of the sides of the ion channel will not be detected. A bias DC "tuning voltage" ($V_c$) is applied on top of the applied waveform to enable subtle adjustment of the peak voltage $V_D$ to counter the drift experienced by an ion of a specific ΔK.

As shown schematically in FIG. 1c, the system comprises an ionizer 110 which generates ions. A drive signal system 130 applies the asymmetric waveform and the tuning voltage to the ion filter 112 to filter the generated ions as described above. The output ions from the ion filter 112 are detected by the detector 114. The output from the detector 114 is sent to a processor 120 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_C$ (kVcm$^1$). The processor may also receive inputs from sensors 116a, 116b in the system, for example a pressure or temperature sensor. The spectral output may alternatively be presented as an m×n matrix of ion current measurements at m compensation field and n dispersion field settings. The outputs may be compared to a database 140 of similar outputs which have been previously gathered to determine the nature of the ions that have been detected. The database may be located in a memory with the spectrometer housing, e.g. on a PCB within the housing.

Figure 2A:
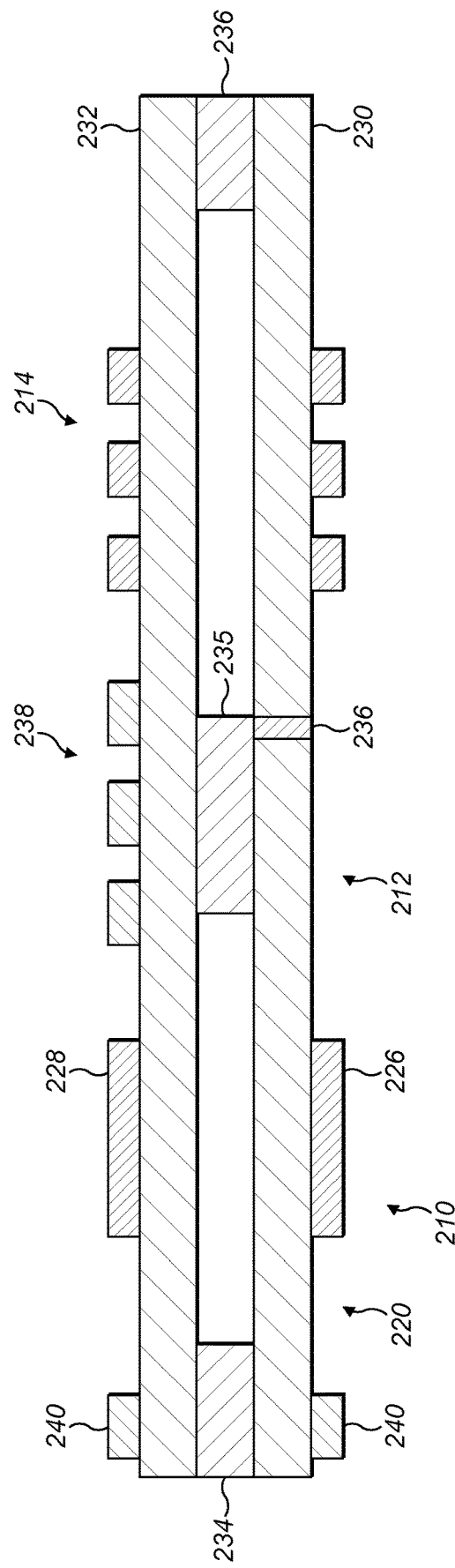
FIGS. 2a and 2b are side and cross-sectional views of a spectrometry system.
Figure 2B:
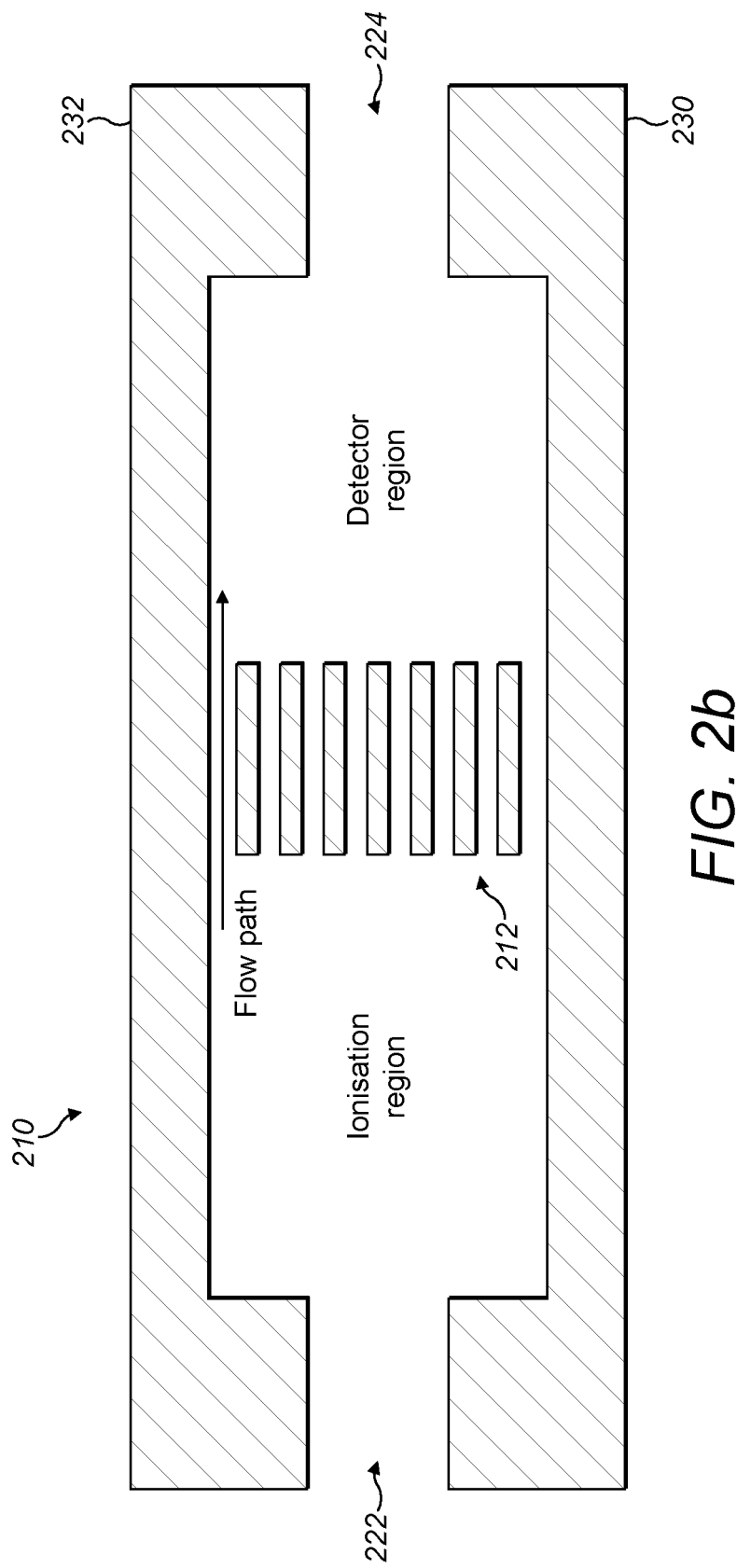

FIGS. 2a and 2b are schematic side and cross-sectional views showing the detailed arrangement of the spectrometry system. The system comprises a housing 220 having an inlet 222 through which a fluid sample enters the housing 220. The housing 220 defines a cavity and as indicated by the arrow there is a flow path through the cavity from the inlet 222 to an outlet 224. The cavity may thus also be termed a channel. The housing may comprise a first (lower) layer 230 and a second (upper) layer 232 which are separated at opposed by a pair of spacers 234, 236. Both layers may be generally plate-like. The inlet 222 is formed through the first spacer 234 and the outlet is formed through the second spacer 234. The first and second layers 230, 232 may be considered to form walls of the housing. The housing may be integrally formed as a single-piece or alternatively may be formed as separate layers and spacers which are bonded together in any suitable method, e.g. resulting in frit. The housing is small, for example defining a cavity having a length of 3 cm, a height of 1 cm and a 7 mm width. It will be appreciated that the numerical values are merely illustrative.

Downstream from the inlet, there is an ionizer 210 which ionizes the fluid sample to generate ions in the ionisation region of the cavity within the housing as shown in FIG. 2b. As shown in FIG. 2a, all the components of the ionizer are located outside the cavity and are thus outside the flow path of both the fluid sample and generated ions. In this arrangement, the ionizer 210 ionizer may be a dielectric barrier corona discharge ionizer. As is known in the art, a dielectric barrier discharge (DBD) is the electrical discharge between two electrodes separated by an insulating dielectric barrier. A typical DBD device comprises a high voltage generator, a high voltage electrode, a ground electrode and a dielectric barrier adjacent the high voltage electrode. Discharge occurs between the dielectric barrier and the ground electrode. DBD devices are described for example in "Dielectric barrier discharges: progress on plasma sources and on the understanding of regimes and single filaments" by Brandenburg published in Plasma Sources Science and Technology volume 26, number 5, IOP Publishing Ltd.

In this arrangement, the ionizer may comprise a first electrode 226 on the outer face of the first layer 230 of the housing 220 and a second electrode 228 on the outer face of the second layer 232 of the housing 220 to provide the opposing electrodes. The first electrode 226 may be a ground electrode and the second electrode 228 may be a high voltage electrode or vice versa. Both electrodes may be generally plate-like as shown or have an alternative suitable shape. In this arrangement, the housing itself provides the dielectric barrier for the ionizer. Accordingly, at least one layer of the housing (e.g. the layer which is adjacent the high voltage electrode) may be formed from a dielectric material having a suitable dielectric constant for producing a corona discharge on an inner surface of the dielectric layer. The dielectric constant may be between 3 and 10. For example, the dielectric material may be glass. Both layers may be formed from the same material, thereby providing a dielectric barrier (or layer) on each electrode. Alternatively, the layers may be made from different materials. The materials may be transparent, e.g. to allow light radiation to enter the housing as described below and may also electrically isolate the electrodes from the ions within the housing. Other examples of suitable materials include neoprene (polychloropene), mica or Mylar™ (biaxially-oriented polyethylene terephthalate).

As shown, the electrodes are mounted to the surface of the housing. The mounting may be by any suitable method, e.g. or anodic bonding. It will also be appreciated that the electrodes could be at least partially or wholly embedded within the housing, e.g. for a more compact design. When embedded, at least part of a layer of housing separates at least one of the electrodes (and normally both) from the cavity by at least part of the housing. In this way, the embedded electrodes are still isolated from the ions within the surface.

Downstream from the ionizer 210, the system comprises an ion filter 212 (also termed an ion mobility filter) which is driven by a drive signal system which applies the asymmetric waveform and the tuning voltage as described above. As schematically illustrated in FIG. 2b, the ion filter 212 comprises a plurality of channels which are schematically shown as parallel in this arrangement. The channels of the ion filter 212 must be located within the fluid path for the ion filter 212 to perform its function. The channels of the ion filter 212 may be formed in a single, e.g. monolithic, electrode layer or may be formed between two or more electrode layers. In this arrangement, to minimise the components of the ion filter 212 which are within the fluid path, only the electrode within which the channels are defined are within the housing. The drive system is located outside the housing and thus it is necessary to provide a via 236 to connect the ion filter 212 to the drive system. The via 236 may be a radio frequency (RF) via to send RF signals to the electrode portions within the cavity and when as shown the via 236 passes through the first layer 230, needs to be sealed.

The ion filter 212 may have any suitable arrangement. Merely as examples, ion filters are described in US2016/336159. WO2019/069089 WO2019/048886 and WO2019/097234, For example, the ion channels may be formed between interdigitated electrodes of opposed polarity. Alternatively, each ion channel may be formed with discrete opposed polarity electrodes which are separate from each other. The channels may be coated and the coating may be applied before separating the channels (e.g. using a UV exposure). The electrodes may be attached to another spacer 235 which is between the opposing inner surfaces of the housing and which is schematically shown in FIG. 2a.

As shown in this arrangement, a heater 238 may be located externally on an outer surface of the second layer 232 of the housing. The heater 238 may be a serpentine heater or any suitable heater. The heater 238 is aligned with the channels of the ion filter 212 and may thus be used to alter the temperature within the ion channels to affect the results of the filtering. An optional heater 240 may also be incorporated aligned with the inlet. Again, the heater is located externally, in this case on outer surfaces of both the first and second layers 230, 232 of the housing.

The output ions from the ion filter 212 are detected by a detector 214 in a detector region adjacent the outlet 224. The output from the detector 214 is sent to a processor (not shown) and described above. As shown, all components of the detector 214 are mounted outside the cavity, e.g. on outer surfaces of the housing. The detector 214 may be any suitable detector, for example a fly through inductive charge detector, e.g. as described on page 15 in the CSEM Technical report 2016.

As described above, all components with the exception of the ion channels of the ion filter are located outside the flow path. In other words, the external components are not in contact with any wetted internal surfaces of the cavity which may come into contact with the fluid sample and/or ions generated therefrom.

Figure 3:
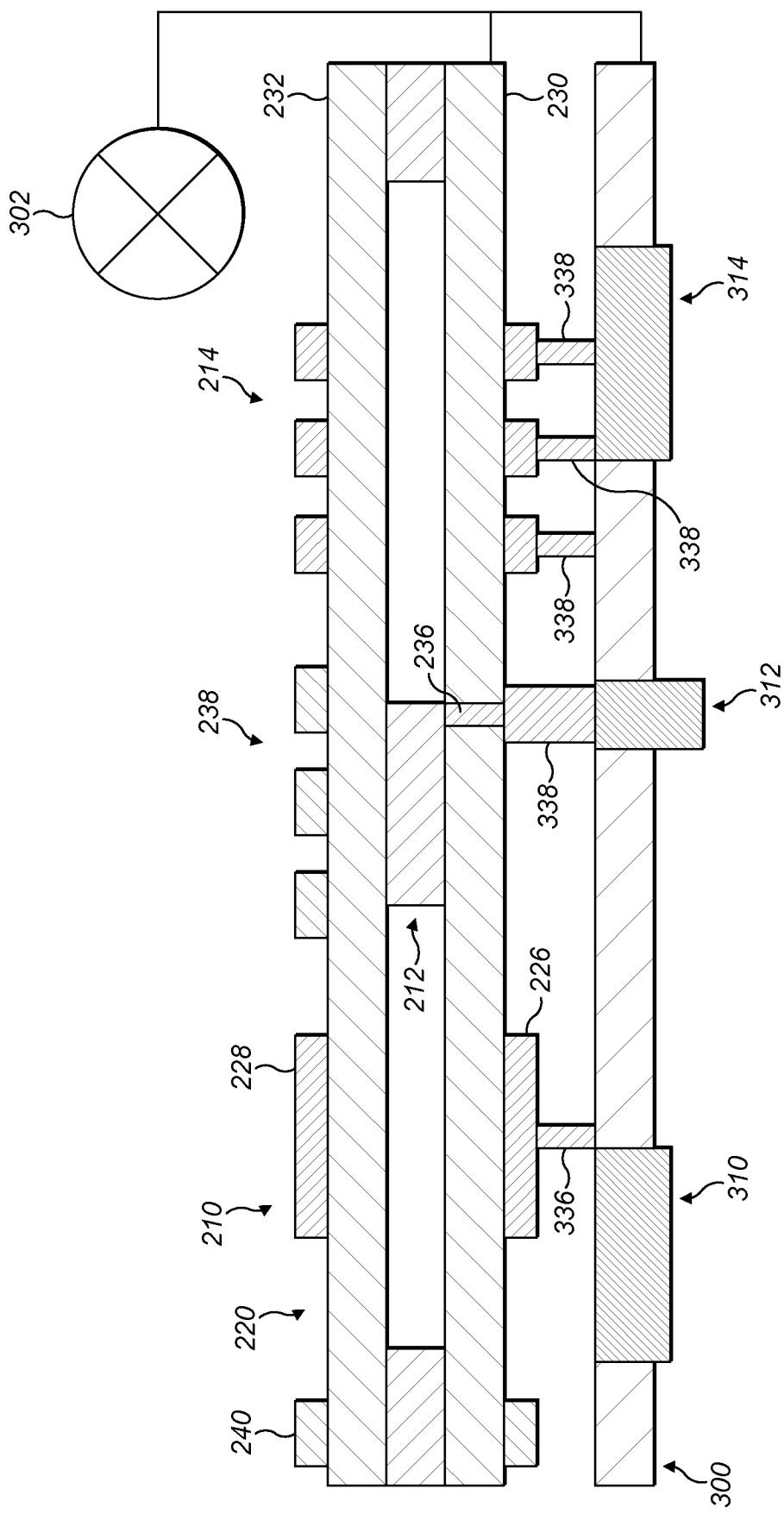
FIGS. 3 and 4 are side view of alternative arrangements for a spectrometry system and FIG. 5 is a flowchart of the method of using a spectrometry system.

FIG. 3 shows an alternative arrangement in which the system of FIG. 2a is mounted with a control board 300 (which may be a printed circuit board (PCB)) on one surface of the housing 220 and a pump 302 on the opposed surface of the housing. As described above, the housing may be an insulating block. The features in common have the same reference number and are not described in detail again. The control board 300 comprises a control circuit 310 which is connected to the ionizer 210. FIG. 3 shows that the first electrode 226 is electrically connected via a connector 336 to the control board 330 but it will be appreciated that there is also a connection to the second electrode 228.

The board 300 also comprises a drive circuit 312 which is connected to the ion filter 212. A connector 338 extends from via 235 to the drive circuit 312. FIG. 3 shows a single connection and via but it will be appreciated there may be a plurality of such connections and via. For example, the first layer of the housing may be patterned with a plurality of vias which are drilled through the housing and which are coated/filled with gold (or another similar suitable conductor) or in which a conductive track (e.g. gold) is inserted therein whereby the necessary connections to the electrodes may be separately/jointly made. The drive circuit 312 may also drive the heater 238 and may thus be connected in any suitable fashion. Alternatively, there may be a separate circuit on the board to drive one or both of the heaters 238, 240 but it will be appreciated that there may also be a connection to the second electrode 228.

The board 300 also comprises a sensor circuit 314 which is connected to the detector 214 and which may pass the output from the detector to a processor on the board. In this arrangement, there is a plurality of connectors 338 which connect separate components of the detector to the sensor circuit 314. The detector 214 may thus comprise a plurality of separate sensors. Alternatively, the number of connectors may be different to match the nature of the detector.

The control board 300 is adjacent the first layer 230 of the housing. Although this is shown in the Figures as the lower layer, this may be a front layer in use. A pump 302 is schematically illustrated and is adjacent the second layer 232 of the housing. Although this is shown in the Figures as the upper layer, this may be a rear layer in use. The pump 302 is connected to the housing 220 to draw air through the inlet, along the fluid path through the cavity and out through the outlet. The pump 302 may also be connected to the control board 300 to control the pump and regulate the flow through the system.

Figure 4:
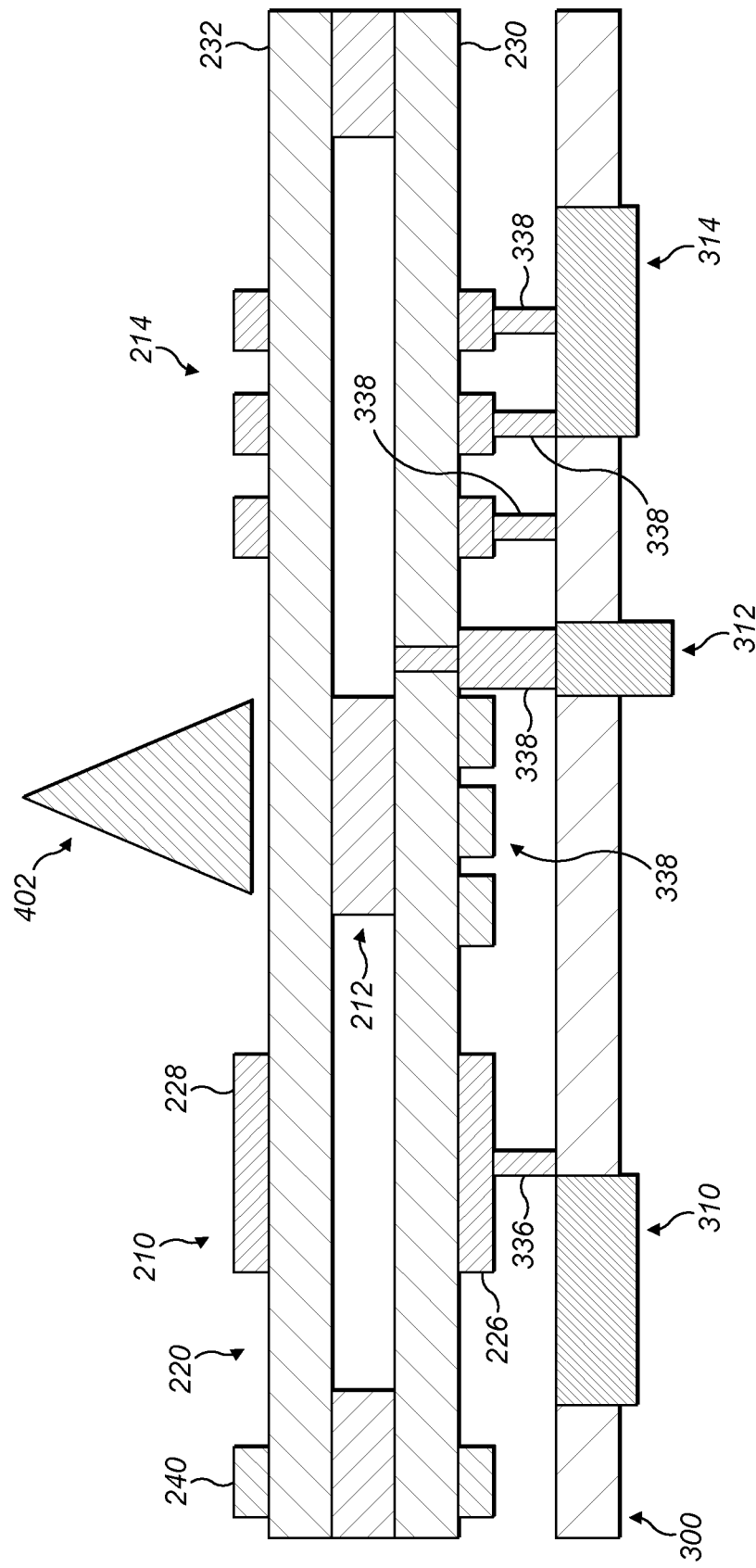

FIG. 4 shows an alternative arrangement in which the system of FIG. 2a is mounted with a control board 300 to one side of the housing 220 and a light source 402 on the opposed side of the housing. The features in common have the same reference number and are not described in detail again.

The light source 402 is aligned with the ion filter 212 and may be an infra-red (IR) light source. The light source 402 thus irradiates the generated ions and the radiation (also termed excitation) may be chosen to excite particular ions which have been generated. Accordingly, the housing needs to be transparent to the radiation which is used, at least in the location of the light source. The light source may be in the vicinity of the ion filter 212, e.g. aligned therewith as shown or before the ion filter. The light source 402 may be connected to the drive circuit 312 for the ion filter 212 or may be connected to a separate control circuit on the control board 300.

There is also a heater 338 which is aligned with the ion filter 212 as in FIGS. 2a and 3 but in this arrangement, the heater 338 is adjacent the first layer 230 of the housing instead of the second layer 232. The heater 338 and/or the light source 402 may be used to change the conditions, e.g. temperature, within the ion channels to change the performance of the ion filter, for example as described in WO2019/058115 to the present applicants.

Figure 5:
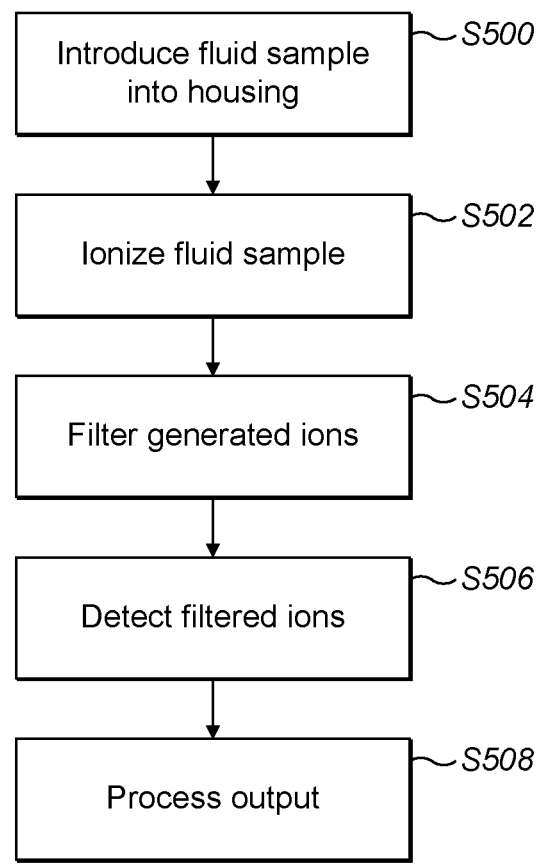

FIG. 5 is a flowchart showing the steps of using one of the spectrometry systems shown above. In a first step S500, a fluid sample is introduced into the system, e.g. through an inlet in the housing as described above. The fluid sample may be pumped through the housing along a fluid or flow path to an outlet. The next step S502 is to ionize the fluid sample to generate sample ions. As described above, the ionizer is external to the housing, i.e. no component of the ionizer is within the housing or within the fluid path. The ionization may be done using a dielectric barrier discharge ionizer. The sample ions are generated in an ionization region within the housing, i.e. at a first location on the fluid path which is downstream from the inlet.

The generated sample ions are then filtered at step S504 using an ion filter as described above. The filtering takes place at a second location on the fluid path which is downstream from the first location. At least a portion of the ion filter, e.g. the electrode layer(s) with the ion channels, is mounted inside the housing, within the fluid path. Optionally, the sample ions may be irradiated (e.g. with UV radiation or another excitation) before or as they are filtered. In other words, there may be an excitation (or radiation) source located within the vicinity of the ion filter, e.g. just upstream of or aligned with the ion filter.

The remaining ions which pass through the ion filter are detected at step S506 using detector as described above, i.e. using a detector which is external to the housing with no component of the ionizer within the housing or within the fluid path. The detector may be a inductive charge detector as described above. The detection may take place in a detector region which is at third location on the fluid path which is downstream from the ion filter.

The output from the detector may then be processed at step S508 together with any necessary information from the system. For example, plots of the dispersion field $E_D$ ($kVcm^{-1}$) against compensation field $E_C$ may be generated, numerical parameters which facilitate chemical detection, identification, classification and/or quantification of the ions may be extracted and changes to the heating and/or radiation of the system may be suggested based on sensor results.

At least some of the example embodiments described herein may be constructed, partially or wholly, using dedicated special-purpose hardware. Terms such as 'processor' or 'controller' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although a few preferred embodiments of the present invention have been shown and described, it will be appreciated by those skilled in the art that various changes and modifications might be made without departing from the scope of the invention, as defined in the appended claims.

The invention claimed is:

1. A sensor system comprising
    a housing having
        an inlet for a fluid sample to enter the housing,
        an outlet for the fluid sample to exit the housing,
        a fluid sample path within the housing for the fluid sample to flow between the inlet and the outlet, and
        a dielectric material;
    a dielectric barrier ionizer which comprises first and second electrodes which are mounted to outer surfaces of the housing with at least one of the first and second electrodes being adjacent the dielectric material in the housing, whereby the ionizer is for ionizing the fluid sample at a first location on the fluid sample path to generate sample ions using a dielectric barrier discharge between the first and second electrodes which are separated by the dielectric material;
    an ion mobility filter which is at least partially located within the housing and which is for filtering the generated sample ions at a second location on the fluid sample path; and
    a detector which is external to the housing and which is for detecting the sample ions which pass through the ion mobility filter at a third location on the fluid sample path;
    wherein all components of the detector are mounted on outer surfaces of the housing.

2. The sensor system of claim 1, wherein the housing is at least partially formed from a dielectric material.

3. The sensor system of claim 1, wherein the housing is at least partially formed from a transparent material.

4. The sensor system of claim 1, wherein the housing comprises glass.

5. The sensor system of claim 1, wherein the housing comprises a first layer and a second layer separated by at least one spacer and the fluid sample path is between the first and second layers.

6. The sensor system of claim 1, wherein the ion filter comprises an electrode layer which is positioned in the fluid sample path within the housing.

7. The sensor system of claim 6, wherein the electrode layer comprises a plurality of mechanically separated electrodes.

8. The sensor system of claim 6, further comprising a radiation source which is located outside the fluid sample path and which is for radiating ions in the vicinity of the ion filter.

9. The sensor system of claim 8, wherein a portion of the housing between the radiation source and the fluid sample path is made of a transparent material.

10. The sensor system of claim 1, wherein a via is formed through the housing to connect to the electrode layer within the housing.

11. The sensor system of claim 1, wherein the detector is a fly-through inductive charge counter.

12. A method of analysing a fluid sample, the method comprising:
    passing the fluid sample along a fluid sample path within a housing comprising a dielectric material,
    ionizing, using a dielectric barrier ionizer which generates a dielectric barrier discharge, the fluid sample at a first location on the fluid sample path to generate sample ions, wherein the ionizer comprises first and second electrodes which are mounted to outer surfaces of the housing and which are separated by the dielectric material in the housing and wherein at least one of the first and second electrodes is adjacent the dielectric material in the housing,
    filtering, using an ion mobility filter, the generated sample ions at a second location on the fluid sample path, and
    detecting, using a detector, the ions passing through the ion mobility filter at a third location on the fluid sample path,
    wherein the ionizer and the detector are external to the housing and are outside the fluid sample path;
    wherein all components of the detector are mounted on outer surfaces of the housing.

13. The method of claim 12 further comprising transmitting radiation through a transparent portion of the housing to excite target ions from the generated sample ions.

* * * * *